United States Patent [19]

Gleason

[11] 4,290,065
[45] Sep. 15, 1981

[54] POSITION TRANSDUCING METHOD AND MEANS

[75] Inventor: Joseph P. Gleason, Woodland Hills, Calif.

[73] Assignee: Thomas P. Sullivan, Los Angeles, Calif.; a part interest

[21] Appl. No.: 139,092

[22] Filed: Apr. 10, 1980

[51] Int. Cl.³ ............... G08C 25/02; G08C 19/10; G08C 19/04
[52] U.S. Cl. .................. 340/870.43; 324/60 R; 340/870.37; 340/870.38
[58] Field of Search ........ 340/200, 186, 187, 177 VC, 340/177 VA, 347 M, 870.37, 870.42, 870.43, 870.38; 318/662; 323/93; 324/60 R, 61 R, 60 CD, 62, 63, 65 R

[56] References Cited

U.S. PATENT DOCUMENTS

| | | | |
|---|---|---|---|
| 3,237,178 | 2/1966 | Valentine | 340/186 |
| 3,296,522 | 1/1967 | Wolfendale | 340/200 |
| 3,784,897 | 1/1974 | Norrie | 340/200 |
| 3,960,010 | 6/1976 | Gustafsson | 324/65 R |
| 4,193,063 | 3/1980 | Hitt et al. | 340/200 |

OTHER PUBLICATIONS

IBM Technical Disclosure Bulletin, Palmer, Dec. 1971, pp. 1989-1990.

Primary Examiner—James J. Groody
Attorney, Agent, or Firm—Ralph B. Pastoriza

[57] ABSTRACT

The position transducer uses an elongated resistance which can be switched to a fixed voltage source to provide a voltage gradient along the resistance. A metal strip with a single aperture is arranged to be moved along parallel to the resistance and another elongated metal conductor is positioned on the other side of the metal strip so that the metal strip with the aperture is sandwiched between the resistance and the conductor. Physical movement of the strip moves the aperture and thus will change the voltage value electrostatically coupled from the voltage on the resistance to the conductor. An analog voltage constituting a function of a digital count value is repetitively switched onto the entire resistance and compared with this voltage value at a given high frequency. If the analog voltage is less than the voltage value on the resistance opposite the aperture, an up count signal is generated to increase the digital count and thus increase the analog voltage. If the analog voltage is greater than the voltage value, a down count signal is generated to decrease the digital count value and thus decrease the analog value. Comparisons are made on each cycle of said given high frequency. Either or both the digital count value and analog signal can be used as an accurate indication of the physical position of the aperture.

6 Claims, 3 Drawing Figures

POSITION TRANSDUCING METHOD AND MEANS

This invention relates generally to transducers and more particularly to an improved position transducer for providing an electrical signal constituting a function of a physical position.

BACKGROUND OF THE INVENTION

Present day transducers wherein an output voltage is provided constituting a function of the physical positioning of an object often take the form of a linear variable differential transformer. Basically, such transducers operate on the principle of positioning a transformer core in a linear manner in accord with the actual physical positioning of an object so that the signal from the transformer will constitute a function of such positioning. Other types of known transducers simply involve moving of a tap along a resistance element to provide a changed voltage output constituting a function of the position of the tap. The tap itself can thus be mechanically connected to an object, the position of which is to be transduced into an electrical signal.

The foregoing type devices, while useful for certain purposes, are not always stable under widely varying temperature conditions. Further, where rubbing contacts such as with voltage taps are utilized, the contacts can become worn and the connecting leads unduly flexed. The overall life of the transducer is thus limited. Finally, voltage drifts in voltage power supplies utilized with such prior art transducers can often introduce errors.

BRIEF DESCRIPTION OF THE PRESENT INVENTION

With the foregoing considerations in mind, the present invention contemplates the provision of an improved position transducer which not only avoids physical rubbing between contacts, flexing of leads and the like but also is substantially independent of temperature variations and voltage drift, all to the end that high reliability and long life is assured.

More particularly, in its broadest aspect, the invention comprises a method of converting a physical position along a given path into an electrical signal constituting a function of such position. The steps involved include the generation of a voltage gradient along the path. Next, an analog voltage constituting a function of a digital count value is provided. This analog voltage is repetatively compared at a given frequency with the voltage value on said path at said physical position. The digital count value at each frequency cycle that said voltage value is greater than the analog value is increased and the digital count value at each frequency cycle that said voltage value is lesser than said analog voltage is decreased. The analog voltage thus seeks a value corresponding substantially to the voltage value on the path at the referred to physical position when the fixed voltage is applied, and thus constitutes the electrical signal comprising a function of such position.

BRIEF DESCRIPTION OF THE DRAWINGS

A better understanding of the transducing method and means of this invention will be had by referring to the accompanying drawings in which.

DETAILED DESCRIPTION OF THE INVENTION

Figure 1:
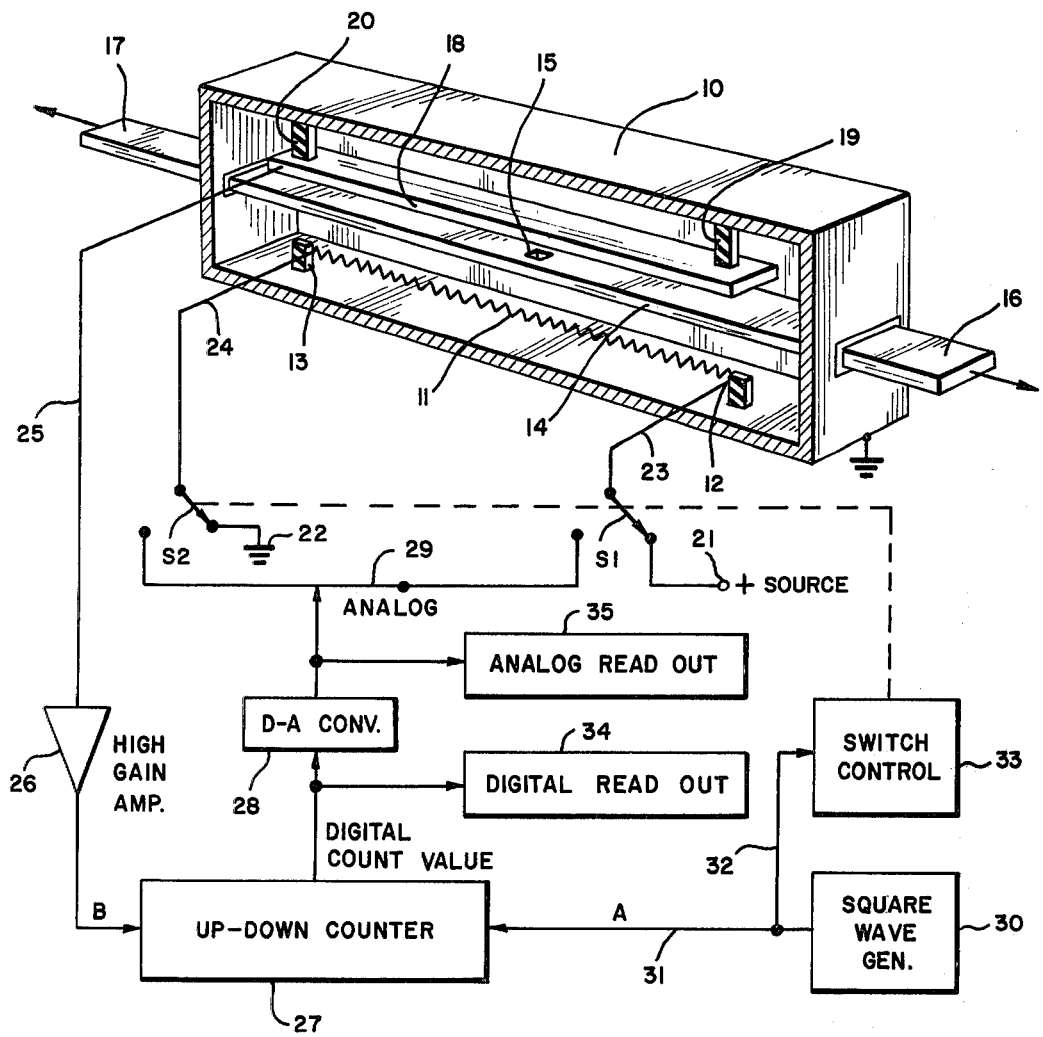
FIG. 1 is a diagrammatic perspective view of a first type of apparatus together with a block diagram of cooperating components for transducing a physical position into an electrical signal in accord with the present invention.

Referring first to the upper portion of FIG. 1, there is shown schematically a metal shielding housing 10 incorporating in its lower portion an elongated member in the form of a fixed resistance 11. Resistance 11 is of a given length and has end terminals 12 and 13 secured in insulated relationship to the housing 10 as shown.

Disposed above and in parallel relationship to the resistance 11 is an elongated metallic strip element 14 having an aperture 15 opposite to an intermediate portion of the resistance member 11. The ends of the elongated strip 14 extend from opposite ends of the housing as at 16 and 17. Strip 14 is a movable member and would be coupled to any physical object, the position of which is to be transduced into an electrical signal. The movement of the elongated strip 14 is indicated by the arrows from the ends 16 and 17 and it will be appreciated that the aperture 15 can assume different positions along the resistance member 11.

Also incorporated within the housing 10 as shown in the upper portion thereof is an elongated conductor 18 supported at its opposite ends by insulators 19 and 20 to the housing 10. Conductor 18 is parallel to the strip 14 and resistance member 11.

A fixed voltage source is indicated at 21 in FIG. 1 relative to ground 22 and is arranged to be connected across the end terminals 12 and 13 of the resistance member 11 by way of switch arm S1 and lead 23 and by way of lead 24 and switch arm S2 as shown. This fixed voltage source will generate a voltage gradient between the end terminal 12 and the end terminal 13. The voltage on the element will vary from a fixed voltage value at the source to zero voltage or ground in the embodiment illustrated.

Directly opposite the aperture 15, the voltage on the resistance 11 will have a value which is linearly and accurately related to the displacement or position of the aperture 15 from the one end 13 of the resistance 11. This voltage value is not directly sensed by the capacitance formed by resistance 11 and elongated conductor 18 through the aperture; however, any change in voltage on the resistance 11 opposite the aperture 15 will be coupled through the capacitance onto lead 25 which passes to the input of a high gain a-c amplifier 26. The output of amplifier 26 is connected to an up-down counter 27. Up-down counter 27 will be instructed to count up or down depending on the signal appearing at the output of the high gain amplifier 26, all as will become clearer as the description proceeds.

A digital to analog converter circuit indicated at 28 receives the digital count value from the up-down counter 27 and converts the same to an analog to voltage which is applied to conductor 29 terminating at its opposite ends in switch terminals for engagement by the switch arms S1 and S2 when these switch arms are simultaneously thrown from the terminals connecting to the source 21 and ground 22 to the terminals at the opposite ends of the conductor 29.

Referring to the lower right portion of FIG. 1, a square wave generator 30 passes a square wave at its output lead 31 to the up-down counter 27 and also by way of branch lead 32 to a switch control 33. Switch control 33 is schematically indicated as connected to the switch arms S1 and S2 for throwing these switches back and forth at a frequency determined by the square wave generator. In this respect, it will be understood that the switches schematically depicted by the switch arms S1 and S2 are actually solid state switches and the switching is effected electronically at the given high frequency determined by the square wave generator.

The foregoing circuit is completed by the provision of a digital read-out display 34 connected to receive the digital count value and an analog read-out display 35 connected to receive the analog voltage passed to the conductor 29 from the digital to analog converter 28.

When the switch arms S1 and S2 are moved from the voltage source and ground terminals to the terminals defining the opposite ends of the conductor 29, the entire resistance 11 assumes the voltage delivered by the digital to analog converter 28. If this analog voltage is higher than the voltage value of the resistance 11 opposite the aperture before the switching of the switch arm, then the capacitance between the resistance 11 and the conductor 18 will couple a rising voltage to the high gain amplifier 26 by way of lead 25. Conversely, if the analog voltage from the digital to analog converter 28 is lower than the voltage value opposite the aperture before the switch arms were switched, a falling voltage will be coupled by way of the capacitance to the high gain amplifier 26.

Depending upon whether the digital to analog output analog voltage on 29 is higher or lower than the voltage value opposite the aperture, a corrective signal is provided from the amplifier 26 to cause the up-down counter 27 to count in an up or a down direction as required to cause the analog voltage to decrease if it is greater than the voltage value on the resistance or increase if it is less than the voltage value. In other words, the up-down counter is instructed to count in an up direction or a down direction to increase or decrease the analog voltage to bring it as close as possible to the voltage value coupled from the resistance through the aperture when the switch arms S1 and S2 are in the solid line position shown in FIG. 1.

Actually, the voltage change is relatively small and this very small change delivered to the input of the amplifier 26 is amplified to a saturation level. It becomes essentially a digital up or down control signal for the up-down counter 27. The counter 27 is clocked to count up or down at the end of the time when the switches S1 and S2 are connected to the opposite ends of conductor 29. Thus, as much time as possible is provided for switching transients to die out before a new cycle begins.

It will be appreciated that the repetitive comparison of the analog voltage with the voltage value takes place each cycle of operation of the square wave generator and an appropriate count pulse or clock pulse is supplied to the up-down counter at each cycle to either cause the counter to count up one count or down one count depending upon the results of the comparison. Because the frequency of the square wave generator may be several thousand cycles per second, a continuous updating occurs even for fairly rapid movements of the aperture relative to the fixed resistance. Moreover, it will be clear that either the digital count value or the analog voltage constitutes an electrical signal indicative of the position of the aperture.

Figure 2:
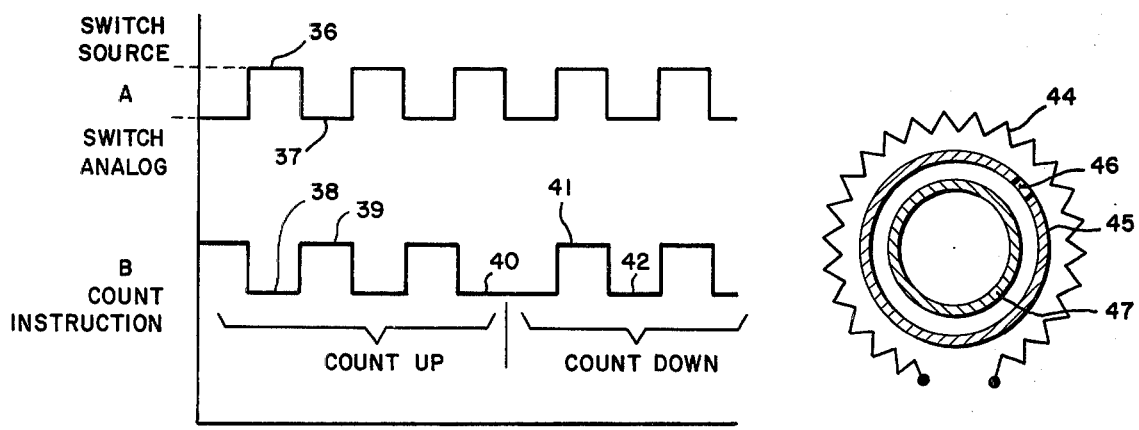
FIG. 2 illustrates a series of wave forms occurring at various points in the diagram of FIG. 1 useful in explaining the operation of the system.

The foregoing will become clearer by referring to FIG. 2 wherein there is shown by the wave form A the square wave output of the square wave generator 30. As indicated at 36, when the square wave is "up" the switches S1 and S2 are connected to the source 21 and ground 22 as indicated in FIG. 1 so that the referred to voltage gradient is developed across the resistance 11. When the square wave is down as indicated at 37 for the wave form A in FIG. 2, the switches S1 and S2 are thrown to the terminals on conductor 29 so that the analog voltage from the digital to analog converter 28 is then placed on the resistance 11.

Wave form B represents the output of the high gain a-c amplifier 26 and constitutes an instruction fed into the up-down counter 27.

For convenience in terminology, the words "voltage value" will be used to indicate the voltage from the resistance 11 coupled through the aperture 15 from the resistance 11 when the source 21 and ground 22 are connected across the resistance 11; that is, during the time period depicted at 36 by the wave form A. The term "analog voltage" on the other hand, will mean the value of the analog voltage placed across the resistance and detected through the aperture 15 resulting from the digital count value, this analog voltage being present when the switch arm S1 and S2 are placed across the conductor 29. The analog voltage always occurs during the time period depicted by the wave form A at 37.

Wave form B will be out of phase with wave form A whenever the voltage value is greater than the analog voltage, this out of phase condition being depicted at 38 and 39 of wave form B relative to portions 36 and 37 of wave form A. Whenever such out of phase condition occurs, the up-down counter 27 is instructed to count up as indicated in FIG. 2.

The up-down counter will continue to count up to increase the digital count value until such time as the analog voltage becomes greater than the voltage value and under these conditions, the phase of wave form B corresponds to the phase of wave form A. The transition is indicated at 40 and it will be noted that when the wave form B is up as at 41 the wave form A is also up and when the wave form B is down as at 42 the wave form A is also down. Thus the portions 41 and 42 of the wave form B will instruct the counter to count down thereby decreasing the digital count value and thus the analog voltage.

Down counts will continue until the analog voltage becomes less than the voltage value at which point a phase reversal will then again occur and a continuous adjustment, as described, will be effective as a consequence of the repetitive comparisons.

The analog signal will correspond substantially to the voltage value depending upon the position of the aperture 15. At each cycle, the counter may count up one count or down one count. The closed loop configuration, however, will assure that the analog voltage will track the detected voltage value as the aperture 15 moves along the resistance 11. Typically the counter might make use of eight or ten bits providing 256 or 1024 descrete levels.

As mentioned heretofore, the digital count value can be displayed in display 34 and the analog voltage can be displayed in display 35, each constituting a signal indicative of the position of the aperture 15 and thus any physical body attached to the elongated strip 14. The actual read-out, of course would be in appropriate units properly calibrated to read physical positions.

It can now be appreciated from the foregoing described system that the digital output available for the digital read-out can also be used directly in digital computer systems. Similarly the analog voltage available for the analog read-out can be used with other analog computer systems by direct connection.

In addition, it is not essential that the long resistor member have a good temperature coefficient. Drift in the value of this resistor produces substantially no error or very little error. Further drift in the value of the power supply voltage does not produce any digital error although a slight analog error would result, because the D to A uses the same power supply as a reference.

The metal shielding 10, resistance member 11, elongated strip 14, and conductor 18 can be physically separated from the remaining electronics shown in the blocks of FIG. 1, there being provided simply the three leads 23, 24 and 25. As a consequence, the electronic portion shown in blocks can be maintained in a proper operating temperature environment and the movable physical element 14 itself be positioned where high temperatures may exist which would otherwise cause damage or errors in the electronic components. In other words, the system of this invention lends itself to operation in extreme environmental conditions.

By utilizing the aperture 15 and electrostatic detection as described, no rubbing contacts are necessary as is the case in a potentiometer. Further, since there are no electrical leads connected to the movable strip 14, no flexing of leads occurs during movement and thus long life is assured for the entire system.

Figure 3:
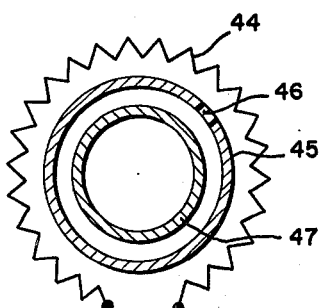
FIG. 3 is a schematic showing of a second embodiment of certain components of the invention.

FIG. 3 shows a manner of configuring the resistance member, elongated strip and conductor into circular arrays in concentric relationship for transducing rotary motion as opposed to rectilinear motion. Thus, the resistance members indicated at 44 in FIG. 3, the elongated strip at 45 with aperture 46 juxtaposed to the resistance 44 and finally the detecting conductor 47 are concentrically disposed within the elongated strip 45. As in the case of the linear arrangement of FIG. 1, the elongated strip 45 with aperture 46 is sandwiched between the resistance member and the conductor.

From all of the foregoing, it will thus be evident that the present invention has provided a greatly improved transducing method and means for providing electrical signals either digital or analog in form constituting a function of the physical position of an object.

Various changes falling within the scope and spirit of this invention will occur to those skilled in the art. The transducer accordingly is not to be thought of as limited to the exact embodiments disclosed merely for illustrative purposes.

I claim:

1. A method of converting a physical position into an electrical signal including the steps of:
   (a) connecting opposite ends of an enlogated resistance member of given length across a fixed voltage source to provide a voltage gradient from one end to the other;
   (b) moving an aperture along said member a distance constituting a function of said physical position;
   (c) providing an analog voltage constituting a function of a digital count value;
   (d) switching the connection of said member back and forth between said fixed voltage source and said analog voltage at a given frequency to provide a comparison of the value of the voltage at the physical position of the aperture and the value of the analog voltage each cycle of said given frequency; and
   (e) increasing the digital count value at each frequency cycle that the voltage value due to the voltage gradient is greater than the analog voltage and decreasing the digital count value each frequency cycle that said voltage value due to said voltage gradient is less than said analog voltage so that said digital count value will always reflect a value determined by the position of said aperture.

2. The method of claim 1, including the additional steps of converting said analog voltage to a visual display calibrated to indicate said physical position as determined by the position of said aperture.

3. The method of claim 1, including the additional step of converting said digital count value to a visual display calibrated to indicate said physical position as determined by the position of said aperture.

4. A position transducer including, in combination:
   (a) an elongated resistance member of given length having opposite end terminals;
   (b) an elongated strip element movable relative to the resistance member, said element having an aperture intermediate its ends juxtaposed to said resistance member;
   (c) an elongated conductor at least coextensive with said resistance member and positioned such that said strip is sandwiched between said conductor and said resistance member;
   (d) an up-down counter for providing a digital count value;
   (e) a digital to analog converter connected to said up-down counter for converting said digital count value into an analog voltage;
   (f) a square wave generator connected to said up-down counter for providing count signals to said counter;
   (g) a fixed voltage source;
   (h) switch means connected to said square wave generator for alternately connecting said fixed voltage source and said analog voltage across said opposite end terminals of said resistance member at the frequency of said square wave generator whereby when said fixed voltage source is connected across said resistance member a voltage gradient is established and a voltage value due to said voltage gradient is momentarily provided on said conductor corresponding to the voltage on said resistance member electrostatically coupled through said aperture, said voltage being a function of the position of said strip element; and when said analog voltage is connected across the ends of said resistance member said analog voltage is momentarily provided on said conductor;
   and
   (i) means including a high gain a-c amplifier connected between said conductor and said up-down counter for repetitively comparing said voltage value due to said voltage gradient at the position of said aperture and said analog voltage, each cycle of the frequency of said square wave generator, said means instructing said up-down counter to count up and thereby increase said digital count value when said voltage value due to said voltage gradient is greater than said analog voltage and instructing said up-down counter to count down to decrease said digital count value when said voltage value due to said voltage gradient is less than said analog voltage, such that the digital count value when converted to an analog signal will correspond substantially to said voltage value coupled through said aperture, said digital count value thus constituting a function of the position of said strip element.

5. A position transducer according to claim 4, in which said elongated resistance member, said elongated strip element and said elongated conductor are all rectilinear and parallel to each other, said strip element moving in a rectilinear manner.

6. A position according to claim 4, in which said elongated resistance member, said elongated strip element and said elongated conductor lie in a circular configuration with said elongated strip and said elongated conductor concentric with said elongated resistance, movement of said elongated strip being rotational movement.

* * * * *